UNITED STATES PATENT OFFICE.

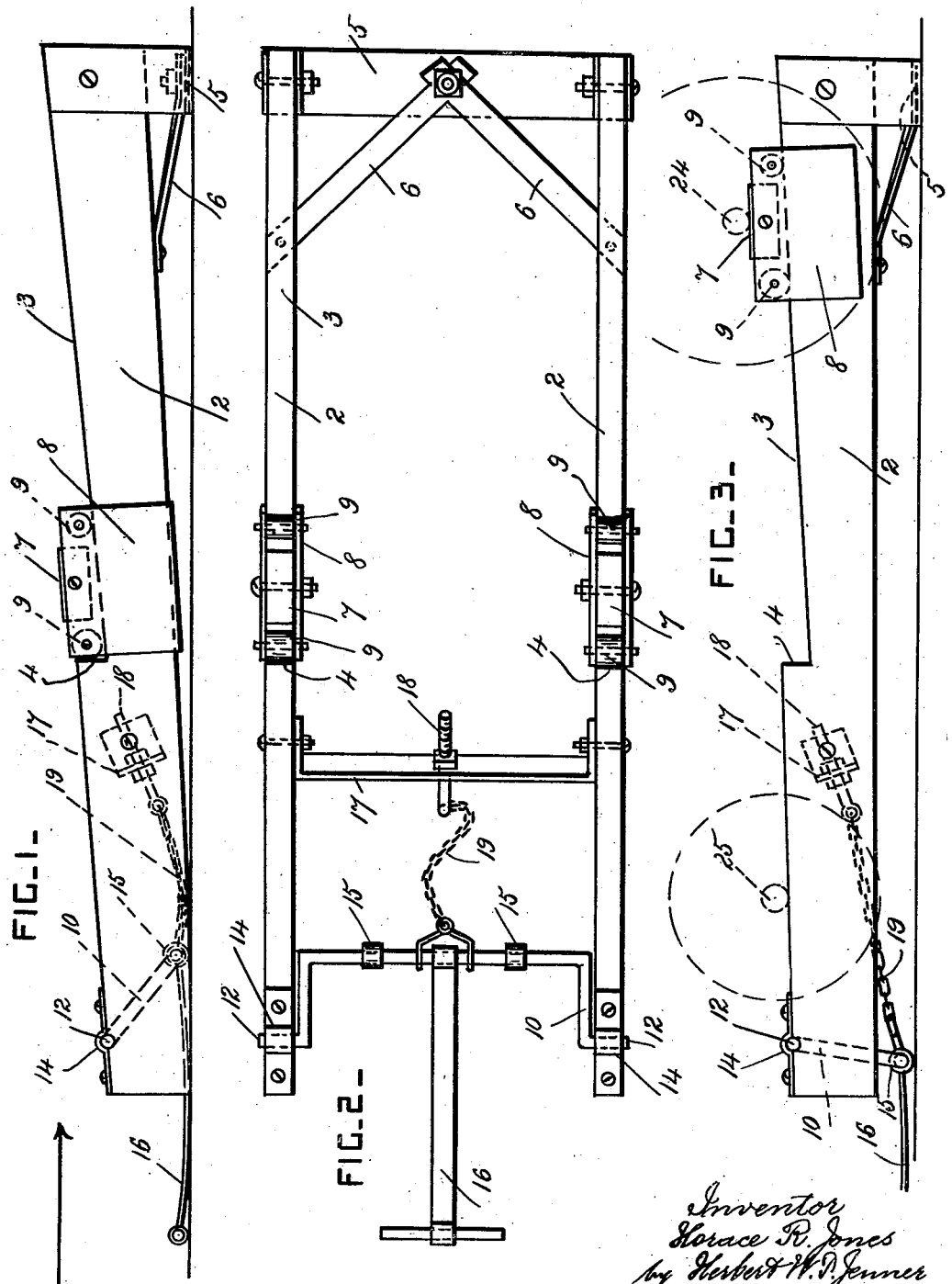

HORACE R. JONES, OF LONG PRAIRIE, MINNESOTA.

LIFTING-JACK.

1,369,282.  Specification of Letters Patent.  Patented Feb. 22, 1921.

Application filed March 24, 1920. Serial No. 368,344.

*To all whom it may concern:*

Be it known that I, HORACE R. JONES, a citizen of the United States, residing at Long Prairie, in the county of Todd and State of Minnesota, have invented certain new and useful Improvements in Lifting-Jacks, of which the following is a specification.

This invention relates to lifting jacks specially adapted for raising motor cars and other similar four wheeled vehicles clear of the ground; and it consists in the novel construction and combination of the parts hereinafter fully described and claimed whereby first one and then the other end portion of the car is raised so that the car is supported in a horizontal position.

In the drawings, Figure 1 is a side view of a lifting jack constructed according to this invention. Fig. 2 is a plan view of the same. Fig. 3 is a side view similar to Fig. 1, but shows the positions of the parts after the car has been raised.

Two longitudinal sills 2 are provided and each sill has an inclined track extending upwardly from a shoulder 4 at the middle part of the sill to the rear end portion thereof. The rear end portions of the sills have a crosspiece 5 secured to them which rests pivotally on the ground and is secured by braces 6. This crosspiece preferably projects below the sills and supports their rear end portions a little above the ground. Carriages 7 are provided, and have side plates 8 which straddle the sills, and 9 are rollers journaled between the side plates, at their end portions, and which run on the inclined tracks 3.

A large crank 10 provided with end pivots 12 is mounted to oscillate in bearings 14 secured to the front end portions of the sills. The arms of this crank are normally inclined downwardly and rearwardly, as shown in Fig. 1, and the crank has rollers 15 which bear on the ground. An operating handle 16 is pivoted to the middle part of the crank and projects forwardly.

A crosspiece 17 is secured between the sills a little in front of the shoulder 4, and 18 is a stop screw which is adjustably attached to this crosspiece. The check or stop screw is connected to the crank by a flexible connection or chain 19.

When the parts are in the positions shown in Fig. 1, the car is driven over the jack in the direction of the arrow. One car axle 24 engages with the two carriages 7 between their rollers, and as the car continues to move toward the rear end of the jack, the carriages are caused to run along the inclined tracks to the positions shown in Fig. 3, thereby raising one end portion of the car clear of the ground. The other car axle 25 is now over the front end portions of the sills, and the crank is pulled by hand to the position shown in Fig. 3, thereby raising the other end portion of the car. The stop screw is arranged to hold the arms of the crank a little past the centers of the pivots so that it is not moved in the reverse direction by the weight of the car when the handle is released.

In carrying out this invention it is immaterial which end of the jack is called the rear end and which the front end, the terms front and rear as being applied in this description being used as a matter of convenience.

What I claim is:

1. A lifting jack, comprising two sills having upwardly and rearwardly inclined tracks at their middle and rear parts, axle carriages running on the said tracks, and a crank pivoted to the front end portions of the sills and adapted to raise them clear of the ground.

2. A lifting jack, comprising two sills having upwardly and rearwardly inclined tracks at their middle and rear parts, a crosspiece secured between the rear end portions of the sills and supporting them clear of the ground, axle carriages running on the said tracks, and a crank pivoted to the front end portions of the sills and adapted to raise them clear of the ground.

3. A lifting jack, comprising two sills having upwardly and rearwardly inclined tracks at their middle and rear parts, axle carriages running on the said tracks, a crank pivoted to the front end portions of the sills and provided with rollers which run on the ground, a handle for moving the crank pivotally to raise the front end portions of the sills, and a check or stop device for limiting the forward movement of the crank when the sills are raised.

In testimony whereof I have affixed my signature.

HORACE R. JONES.